(12) United States Patent
Lunttila et al.

(10) Patent No.: US 12,047,179 B2
(45) Date of Patent: *Jul. 23, 2024

(54) METHOD AND APPARATUS FOR ALLOCATING ACKNOWLEDGEMENT RESOURCES

(71) Applicant: NOKIA SOLUTIONS AND NETWORKS OY, Espoo (FI)

(72) Inventors: Timo Erkki Lunttila, Espoo (FI); Esa Tapani Tiirola, Kempele (FI); Kari Juhani Hooli, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/144,556

(22) Filed: May 8, 2023

(65) Prior Publication Data

US 2023/0275701 A1 Aug. 31, 2023

Related U.S. Application Data

(63) Continuation of application No. 16/997,192, filed on Aug. 19, 2020, now Pat. No. 11,646,827, which is a
(Continued)

(30) Foreign Application Priority Data

Jan. 7, 2016 (WO) .................. PCT/EP2016/050188

(51) Int. Cl.
*H04L 1/1812* (2023.01)
*H04L 1/1829* (2023.01)
(Continued)

(52) U.S. Cl.
CPC .......... *H04L 1/1812* (2013.01); *H04L 1/1861* (2013.01); *H04L 5/0055* (2013.01);
(Continued)

(58) Field of Classification Search
None
See application file for complete search history.

(56) References Cited

U.S. PATENT DOCUMENTS 8,437,705 B2 5/2013 Khoshnevis et al.
9,191,326 B2 11/2015 Han et al.
(Continued)

FOREIGN PATENT DOCUMENTS

CN 103444240 A 12/2013
CN 103918214 A 7/2014
(Continued)

OTHER PUBLICATIONS

Office Action for Chinese Application No. 202110623297.7 dated Oct. 12, 2023, 12 pages.
(Continued)

*Primary Examiner* — Otis L Thompson, Jr.
(74) *Attorney, Agent, or Firm* — ALSTON & BIRD LLP (57) ABSTRACT

A method includes receiving initial acknowledgement resource information at a user device from a base station. The initial acknowledgement resource information is associated with a subset of acknowledgement resources. The method includes determining in dependence on the initial acknowledgement resource information which of the subset of acknowledgement resources is to be used. The user device transmits an acknowledgement on the determined resource.

40 Claims, 5 Drawing Sheets

Related U.S. Application Data continuation of application No. 16/068,174, filed as application No. PCT/EP2017/050073 on Jan. 3, 2017, now Pat. No. 10,805,049.

(51) Int. Cl.
  *H04L 5/00* (2006.01)
  *H04W 36/00* (2009.01)
  *H04W 74/0833* (2024.01)
  *H04W 76/27* (2018.01)

(52) U.S. Cl.
  CPC ... *H04W 36/0005* (2013.01); *H04W 74/0833* (2013.01); *H04W 76/27* (2018.02); *H04L 1/1864* (2013.01); *H04L 5/0007* (2013.01)

(56) References Cited

U.S. PATENT DOCUMENTS

| | | |
|---|---|---|
| 9,237,566 B2 | 1/2016 | Park et al. |
| 9,614,657 B2 | 4/2017 | Tiirola et al. |
| 9,948,487 B2 | 4/2018 | Dinan |
| 10,154,490 B2 | 12/2018 | Aiba et al. |
| 10,674,487 B2 | 6/2020 | Lee et al. |
| 2009/0046793 A1 | 2/2009 | Love et al. |
| 2009/0207793 A1 | 8/2009 | Shen et al. |
| 2009/0245198 A1* | 10/2009 | Tiirola ............... H04W 72/0453 370/330 |
| 2011/0317653 A1 | 12/2011 | Kwon et al. |
| 2012/0113938 A1 | 5/2012 | Larsson et al. |
| 2012/0155337 A1 | 6/2012 | Park |
| 2012/0170479 A1 | 7/2012 | Ren et al. |
| 2012/0254890 A1 | 10/2012 | Li et al. |
| 2012/0307755 A1 | 12/2012 | Kim et al. |
| 2012/0307779 A1* | 12/2012 | Noh ...................... H04L 5/0051 370/329 |
| 2012/0314671 A1* | 12/2012 | Noh ........................ H04L 5/005 370/329 |
| 2012/0320848 A1 | 12/2012 | Chen et al. |
| 2013/0121260 A1 | 5/2013 | Mukherjee et al. |
| 2013/0121304 A1 | 5/2013 | Nory et al. |
| 2013/0157669 A1* | 6/2013 | Turtinen ............... H04W 48/12 455/450 |
| 2013/0242881 A1 | 9/2013 | Wang et al. |
| 2013/0272258 A1 | 10/2013 | Lee et al. |
| 2013/0272294 A1 | 10/2013 | Mildh et al. |
| 2013/0336226 A1* | 12/2013 | Noh ...................... H04L 5/0057 370/328 |
| 2014/0036810 A1 | 2/2014 | Harrison et al. |
| 2014/0112263 A1* | 4/2014 | Lee .................... H04W 72/0446 370/329 |
| 2014/0119284 A1 | 5/2014 | Baldemair et al. |
| 2014/0164864 A1 | 6/2014 | Takeda et al. |
| 2014/0177449 A1 | 6/2014 | Novak et al. |
| 2014/0226583 A1 | 8/2014 | Oizumi et al. |
| 2014/0241285 A1 | 8/2014 | Pang et al. |
| 2015/0004918 A1 | 1/2015 | Wang et al. |
| 2015/0117346 A1 | 4/2015 | Lin et al. |
| 2015/0124743 A1 | 5/2015 | Damnjanovic et al. |
| 2015/0172988 A1 | 6/2015 | Lai et al. |
| 2015/0207607 A1 | 7/2015 | Tang et al. |
| 2015/0237611 A1 | 8/2015 | Ahn et al. |
| 2015/0280883 A1 | 10/2015 | Seo et al. |
| 2016/0013894 A1 | 1/2016 | Papasakellariou |
| 2016/0036569 A1 | 2/2016 | Kim et al. |
| 2016/0198438 A1 | 7/2016 | Wong et al. |
| 2016/0302184 A1 | 10/2016 | Belleschi et al. |
| 2017/0064696 A1 | 3/2017 | He et al. |
| 2018/0083752 A1* | 3/2018 | Kim ...................... H04L 5/0048 |
| 2018/0212717 A1* | 7/2018 | Yang ..................... H04L 1/1812 |
| 2018/0248669 A1 | 8/2018 | Takeda et al. |
| 2018/0263060 A1 | 9/2018 | Tirronen et al. |
| 2018/0368138 A1 | 12/2018 | Jung et al. |
| 2018/0368169 A1 | 12/2018 | Jung et al. |
| 2018/0376411 A1 | 12/2018 | Rinne et al. |
| 2019/0141590 A1 | 5/2019 | Li et al. |
| 2020/0137742 A1 | 4/2020 | Yang et al. |
| 2021/0266817 A1 | 8/2021 | Wallentin et al. |
| 2021/0266957 A1 | 8/2021 | Shrestha et al. |

FOREIGN PATENT DOCUMENTS

| | | |
|---|---|---|
| CN | 103988551 A | 8/2014 |
| CN | 104782208 A | 7/2015 |
| EP | 1758277 A2 | 2/2007 |
| EP | 2 624 652 A1 | 8/2013 |
| EP | 2 768 265 A1 | 8/2014 |
| WO | WO 2015/018071 A1 | 2/2015 |
| WO | WO 2016/161629 A1 | 10/2016 |

OTHER PUBLICATIONS

US 10,292,165, 10/2016, Wu et al. (withdrawn).
Alcatel-Lucent et al, "Remaining Details of PUCCH Design for Rel-13 MTC", 3GPP TSG RAN WG1 Meeting #83, R1-157273, (Nov. 16-20, 2015), 5 pages.
Bhamri et al., "Overview of Uplink Control Channel for Carrier Aggregation Enhancements in LTE Rel. 13", IEEE Conference on Standards for Communication and Networking (CSCN), (Oct. 2015), 5 pages.
Catt, "PUCCH Resource Allocation for TDD eIMTA", 3GPP TSG RAN WG1 Meeting #75, R1-135059, (Nov. 11-15, 2013), 4 pages.
Decision to Grant for Chinese Application No. 201780013093.3 dated Mar. 22, 2021, 3 pages.
Extended European Search Report for European Application No. 21214437.2 dated Feb. 18, 2022, 12 pages.
First Examination Report for Indian Application No. 201817024960 dated Jun. 29, 2020, 6 pages.
Huawei et al., "PUCCH ACK/NACK Resource Allocation for ePDCCH", 3GPP TSG RAN WG1 Meeting #69, R1-121969, (May 21-25, 2012), 2 pages.
Huawei et al., "Remaining Details of PUCCH Resource Determination for MTC UEs" 3GPP TSG RAN WG1 Meeting #83, R1-156445, (Nov. 15-22, 2015), 8 pages.
Intel Corporation; "PUCCH resource allocation"; R1-124122; 3GPP TSG-RAN WG1 Meeting #70bis; San Diego, USA; Oct. 8-12, 2012; whole document (7 pages).
Lenovo; "PUCCH design for Rel-13 MTC UEs"; R1-154502; 3GPP TSG RAN WG1 Meeting #82; Beijing, China; Aug. 24-28, 2015; whole document (4 pages).
MediaTek Inc., "Discussion on HARQ-ACK PUCCH Resource for TDD eIMTA", 3GPP TSG-RAN WG1 Meeting #74bis, R1-135421, (Oct. 7-11, 2013), 3 pages.
Non-Final Office Action for U.S. Appl. No. 16/068,174 dated Nov. 5, 2019.
Non-Final Office Action for U.S. Appl. No. 16/997,192 dated Aug. 31, 2021.
Notice of Allowance for U.S. Appl. No. 16/068,174 dated May 19, 2020.
Notice of Allowance for U.S. Appl. No. 16/068,174 dated Sep. 4, 2020.
Notice of Allowance for U.S. Appl. No. 16/997,192 dated Feb. 24, 2022.
Notice of Allowance for U.S. Appl. No. 16/997,192 dated Jan. 5, 2023.
Notice of Allowance for U.S. Appl. No. 16/997,192 dated May 23, 2022.
Notice of Allowance for U.S. Appl. No. 16/997,192 dated Sep. 6, 2022.
Notice of Allowance for Vietnamese Application No. 1-2018-03313 dated Nov. 21, 2022, 2 pages.
Notice of Eligibility for Grant for Singapore Application No. 11201805839Y dated Nov. 6, 2020, 5 pages.
Office Action for Chinese Application No. 201780013093.3 dated Jun. 28, 2020, 6 pages.
Office Action for European Application No. 17701035.2 dated May 7, 2021, 4 pages.

(56) References Cited

OTHER PUBLICATIONS

Office Action for European Application No. 17701035.2 dated Nov. 26, 2020, 6 pages.
Office Action for Indonesian Application No. P00201912071 dated Oct. 20, 2022, 4 pages.
Office Action for Indonesian Application No. PID 201805501 dated Sep. 17, 2019, 4 pages.
Office Action for Malaysian Application No. PI 2018001263 dated Jun. 15, 2021, 3 pages.
Office Action for Singapore Application No. 11201805839Y dated Dec. 26, 2019, 7 pages.
Office Action for Thailand Application No. 1801004085 dated Feb. 17, 2020, 3 pages.
Office Action for Vietnamese Application No. 1-2018-03313 dated Aug. 19, 2021, 4 pages.
Office Action for Vietnamese Application No. 1-2018-03313 dated Aug. 22, 2018, 2 pages.
Panasonic; "Remaining issues on PUCCH resource allocation for EPDCCH"; R1-124243; 3GPP TSG-RAN WG1 Meeting #70bis; San Diego, USA; Oct. 8-12, 2012; whole document (8 pages).
RAN WG4, "LS Response on the Structure of the Discovery Reference Signal for Small Cell Discovery", 3GPP TSG RAN WG1 Meeting #80, R1-150055, (Feb. 9-13, 2015), 1 page.
Texas Instruments; "HARQ-ACK feedback for EIMTA"; R1-135247; 3GPP TSG RAN WG1 #75; San Francisco, USA; Nov. 11-15, 2013; whole document (4 pages).
Non-Final Office Action for U.S. Appl. No. 18/144,556 dated Dec. 19, 2023.
Office Action for Chinese Application No. 202110618704.5 dated Sep. 20, 2023, 11 pages.
Office Action for Indonesian Application No. PID201805501 dated Sep. 5, 2023, 4 pages.
Notice of Allowance for Malaysia Application No. PI2018001263 dated Jun. 6, 2023, 1 page.
Notice of Allowance for Thailand Application No. 1801004085 dated Jan. 7, 2021, 2 pages.
LG Electronics, "Uplink ACK/NACK Resource Allocation in TDD", 3GPP TSG RAN WG1 #52bis, R1-081568, (Mar. 31-Apr. 4, 2008), 8 pages.
"3rd Generation Partnership Project; Technical Specification Group Radio Access Network; Evolved Universal Terrestrial Radio Access (E-UTRA); Physical layer procedures (Release 8)", 3GPP TS 36.213 v8.8.0, (Sep. 2009), 77 pages.
"3rd Generation Partnership Project; Technical Specification Group Radio Access Network; Evolved Universal Terrestrial Radio Access (E-UTRA); Radio Resource Control (RRC); Protocol specification (Release 8)", 3GPP TS 36.331 v8.9.0, (Mar. 2010), 211 pages.
CATT, "PUCCH resource allocation and frequency hopping for Rel-13 MTC UEs", 3GPP TSG RAN WG1 Meeting #82bis, R1-155171, (Oct. 5-9, 2015), 4 pages.
Ericsson, "PUCCH definition for MTC", 3GPP TSG RAN WG1 Meeting #83, R1-156415, (Nov. 15-22, 2015), 7 pages.
Ericsson, "Summary of informal email discussion on PUCCH for MTC", 3GPP TSG RAN WG1 Meeting #83, R1-157474, (Nov. 15-22, 2015), 16 pages.
LG Electronics, "Uplink ACK/NACK Index Mapping", 3GPP RAN WG1 #48-BIS, R1-071547, (Mar. 26-30, 2007), 5 pages.
MediaTek Inc., "Discussion on PUCCH Resource Allocation for Rel-13 MTC", 3GPP TSG-RAN WG1 Meeting #82, R1-154719, (Aug. 24-28, 2015), 4 pages.
MediaTek Inc., "PUCCH resource determination for Rel-13 MTC", 3GPP TSG-RAN WG1 Meeting #83, R1-157382, (Nov. 15-22, 2015), 3 pages.
ZTE, "Remaining issues on PUCCH for MTC enhancement", 3GPP TSG RAN WG1 Meeting #83, R1-156665, (Nov. 15-22, 2015), 6 pages.

\* cited by examiner

METHOD AND APPARATUS FOR ALLOCATING ACKNOWLEDGEMENT RESOURCES

CROSS-REFERENCE TO RELATED APPLICATIONS

This application is a continuation of U.S. Non-Provisional patent application Ser. No. 16/997,192, filed Aug. 19, 2020 and entitled "Method and Apparatus for Allocating Acknowledgement Resources," which is a continuation of U.S. Non-Provisional patent application Ser. No. 16/068,174, filed Jul. 5, 2018 and entitled "Method and Apparatus for Allocating Acknowledgement Resources," which is a National Stage Entry of International Patent Application Serial No. PCT/EP2017/050073, filed Jan. 3, 2017 and entitled "Method and Apparatus for Allocating Acknowledgement Resources," which claims the benefit of priority to International Patent Application Serial No. PCT/EP2016/050188, filed Jan. 7, 2016, the entire disclosures of each of which are hereby incorporated herein by reference in their entireties for all purposes.

FIELD

This disclosure relates to a method and apparatus, and in particular but not exclusively to a method and apparatus in which acknowledgement resources to be used are determined.

SUMMARY

A communication system can be seen as a facility that enables communication between two or more devices such as user terminals, machine-like terminals, base stations and/or other nodes by providing carriers between the communication devices. A communication system can be provided for example by means of a communication network and one or more compatible communication devices. The communication may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless system at least a part of communications between at least two stations occurs over wireless interfaces. Examples of wireless systems include public land mobile networks (PLMN), satellite based communication systems and different wireless local networks, for example wireless local area networks (WLAN). A local area wireless networking technology allowing devices to connect to a data network is known by the tradename Wi-Fi (or Wi-Fi). Wi-Fi is often used synonymously with WLAN.

The wireless systems can be divided into cells, and are therefore often referred to as cellular systems. A user can access a communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

A communication system and associated devices typically operate in accordance with a given standard or specification which sets out what the various entities associated with the system are permitted to do and how that should be achieved. Communication protocols and/or parameters which shall be used for the connection are also typically defined. Examples of standardized radio access technologies include GSM (Global System for Mobile), EDGE (Enhanced Data for GSM Evolution) Radio Access Networks (GERAN), Universal Terrestrial Radio Access Networks (UTRAN) and evolved UTRAN (E-UTRAN). An example of standardized communication system architectures is the long-term evolution (LTE) of the Universal Mobile Telecommunications System (UMTS) radio-access technology. The LTE is being standardized by the 3rd Generation Partnership Project (3GPP). The LTE employs the Evolved Universal Terrestrial Radio Access Network (E-UTRAN) access. Further development of LTE are sometimes referred to as LTE Advanced (LTE-A). The various development stages of 3GPP specifications are referred to as releases. In this description 3GPP release versions are distinguished by acronym "Rel-nn".

Rel-13 LTE LAA (Licensed Assisted Access) specifications are aimed to provide definitions for licensed-assisted access to unlicensed radio spectrum. The access is intended to coexist with other technologies and fulfil regulatory requirements. In Rel-13 LAA, unlicensed spectrum is utilized to improve LTE downlink (DL) throughput.

According to an aspect, there is provided a method comprising: receiving initial acknowledgement resource information at a user device from a base station, said initial acknowledgement resource information being associated with a subset of acknowledgement resources; determining in dependence on said initial acknowledgement resource information which of said subset of acknowledgement resources is to be used; and causing transmission by the user device of an acknowledgement on said determined resource.

The method may comprise receiving the initial acknowledgement resource information at the user device from the base station during one of an initial access phase and a handover procedure.

The method may comprise subsequently receiving dedicated acknowledgment resource information and causing transmission by the user device of an acknowledgment in a resource associated with said dedicated acknowledgement resource information.

The Initial acknowledgement resource information may comprise common acknowledgement resource information associated with a cell.

The acknowledgement resource information may comprise temporary acknowledgement resource information.

The method may comprise receiving at least one of: system information, at least one random access message, at least one radio resource control reconfiguration message; and a handover command from said base station, said at least one of said system information, the at least one random access message, the at least one radio resource control reconfiguration message, and the handover command being used to provide at least one of information on said subset of acknowledgement resource information and said initial acknowledgement resource information.

The acknowledgement resource information may provide information about a physical uplink control channel to be used by said user device for acknowledgment information.

The acknowledgment information may comprise a hybrid automatic repeat request acknowledgement.

The acknowledgement resource information may comprise an acknowledgement resource indicator.

The subset of acknowledgement resources may comprise at least one resource index in an orthogonal resource space.

The method may be performed in an apparatus. The apparatus may be in a user device.

According to an aspect, there is provided an apparatus in a communication device, the apparatus comprising at least one processor, and at least one memory including computer program code, wherein the at least one memory and the computer program code are configured, with the at least one processor, to: receive initial acknowledgement resource information from a base station, said initial acknowledgement resource information being associated with a subset of acknowledgement resources; determine in dependence on said initial acknowledgement resource information which of said subset of acknowledgement resources is to be used; and cause transmission of an acknowledgement on said determined resource.

The at least one memory and the computer code may be configured, with the at least one processor, to receive the initial acknowledgement resource information at the user device from the base station during one of an initial access phase and a handover procedure.

The at least one memory and the computer code may be configured, with the at least one processor, to subsequently receive dedicated acknowledgment resource information and cause transmission by the user device of an acknowledgment in a resource associated with said dedicated acknowledgement resource information.

The initial acknowledgement resource information may comprise common acknowledgement resource information associated with a cell.

The acknowledgement resource information may comprise temporary acknowledgement resource information.

The at least one memory and the computer code may be configured, with the at least one processor, to receive at least one of: system information, at least one random access message, at least one radio resource control reconfiguration message; and a handover command from said base station, said at least one of said system information, the at least one random access message, the at least one radio resource control reconfiguration message, and the handover command being used to provide at least one of information on said subset of acknowledgement resource information and said initial acknowledgement resource information.

The acknowledgement resource information may provide information about a physical uplink control channel to be used by said user device for acknowledgment information.

The acknowledgment information may comprise a hybrid automatic repeat request acknowledgement.

The acknowledgement resource information may comprise an acknowledgement resource indicator.

The subset of acknowledgement resources may comprise at least one resource index in an orthogonal resource space.

According to an aspect, there is provided an apparatus comprising: means for receiving initial acknowledgement resource information from a base station, said initial acknowledgement resource information being associated with a subset of acknowledgement resources; determining in dependence on said initial acknowledgement resource information which of said subset of acknowledgement resources is to be used; and causing transmission of an acknowledgement on said determined resource.

The means for receiving may be for receiving the initial acknowledgement resource information at the user device from the base station during one of an initial access phase and a handover procedure.

The means for receiving may be for subsequently receiving dedicated acknowledgment resource information and the transmission means may be for causing transmission of an acknowledgment in a resource associated with said dedicated acknowledgement resource information.

The initial acknowledgement resource information may comprise common acknowledgement resource information associated with a cell.

The acknowledgement resource information may comprise temporary acknowledgement resource information.

The receiving means may be for receiving at least one of: system information, at least one random access message, at least one radio resource control reconfiguration message; and a handover command from said base station, said at least one of said system information, the at least one random access message, the at least one radio resource control reconfiguration message, and the handover command being used to provide at least one of information on said subset of acknowledgement resource information and said initial acknowledgement resource information.

The acknowledgement resource information may provide information about a physical uplink control channel to be used by said user device for acknowledgment information.

The acknowledgment information may comprise a hybrid automatic repeat request acknowledgement.

The acknowledgement resource information may comprise an acknowledgement resource indicator.

The subset of acknowledgement resources may comprise at least one resource index in an orthogonal resource space.

A device and/or a communication system comprising an apparatus configured to provide at least one of the embodiments can also be provided. The device may comprise a communication device such as a user equipment.

According to another aspect there is provided a method comprising: causing initial acknowledgement resource information to be transmitted from a base station to a user device, said initial acknowledgement resource information being associated with a subset of acknowledgement resources; and receiving at said base station from said user device an acknowledgement on one of said subset of acknowledgement resources.

The method may comprise causing the initial acknowledgement resource information to be transmitted from the base station during one of an initial access phase and a handover procedure.

The method may comprise subsequently causing transmission of dedicated acknowledgment resource information and receiving from the user device of an acknowledgment in a resource associated with said dedicated acknowledgement resource information.

The initial acknowledgement resource information may comprise common acknowledgement resource information associated with a cell.

The acknowledgement resource information may comprise temporary acknowledgement resource information.

The method may comprise causing transmission of at least one of: system information, at least one random access message, at least one radio resource control reconfiguration message; and a handover command from said base station, said at least one of said system information, the at least one random access message, the at least one radio resource control reconfiguration message, and the handover command being used to provide at least one of information on said subset of acknowledgement resource information and said initial acknowledgement resource information.

The acknowledgement resource information may provide information about a physical uplink control channel to be used by said user device for acknowledgment information.

The acknowledgment information may comprise a hybrid automatic repeat request acknowledgement.

The acknowledgement resource information may comprise an acknowledgement resource indicator.

The subset of acknowledgement resources may comprise at least one resource index in an orthogonal resource space.

The method may comprise causing initial acknowledgement resource information to be transmitted from the base station to a second user device, said initial acknowledgement resource information being associated with a second subset of acknowledgement resources different from the set of subset of acknowledgement resources associated with the first device. This may be the case where the initial acknowledgement resource information is temporary acknowledgement resource information.

The method may be performed by an apparatus. The apparatus may be provided in a base station.

According to another aspect there is provided an apparatus comprising: means for causing initial acknowledgement resource information to be transmitted to a user device, said initial acknowledgement resource information being associated with a subset of acknowledgement resources; and means for receiving from said user device an acknowledgement on one of said subset of acknowledgement resources.

The means for causing transmission may be for causing the initial acknowledgement resource information to be transmitted during one of an initial access phase and a handover procedure.

The means for causing transmission subsequently causing transmission of dedicated acknowledgment resource information and the means for receiving may be for receiving from the user device of an acknowledgment in a resource associated with said dedicated acknowledgement resource information.

The Initial acknowledgement resource information may comprise common acknowledgement resource information associated with a cell.

The acknowledgement resource information may comprise temporary acknowledgement resource information.

The means for causing transmission may be for causing transmission of at least one of: system information, at least one random access message, at least one radio resource control reconfiguration message; and a handover command from said base station, said at least one of said system Information, the at least one random access message, the at least one radio resource control reconfiguration message, and the handover command being used to provide at least one of Information on said subset of acknowledgement resource Information and said Initial acknowledgement resource Information.

The acknowledgement resource Information may provide Information about a physical uplink control channel to be used by said user device for acknowledgment Information.

The acknowledgment Information may comprise a hybrid automatic repeat request acknowledgement.

The acknowledgement resource information may comprise an acknowledgement resource Indicator.

The subset of acknowledgement resources may comprise at least one resource index in an orthogonal resource space.

A device and/or a communication system comprising an apparatus configured to provide at least one of the embodiments can also be provided. The device may comprise a device such as a base station.

According to another aspect there Is provided an apparatus in a base station, the apparatus comprising at least one processor, and at least one memory Including computer program code, wherein the at least one memory and the computer program code are configured, with the at least one processor, to: cause Initial acknowledgement resource Information to be transmitted to a user device, said Initial acknowledgement resource Information being associated with a subset of acknowledgement resources; and receive from said user device an acknowledgement on one of said subset of acknowledgement resources.

The at least one memory and the computer code may be configured, with the at least one processor, to cause the Initial acknowledgement resource Information to be transmitted from the base station during one of an Initial access phase and a handover procedure.

The at least one memory and the computer code may be configured, with the at least one processor, to subsequently cause transmission of dedicated acknowledgment resource Information and receive from the user device of an acknowledgment in a resource associated with said dedicated acknowledgement resource Information.

The Initial acknowledgement resource Information may comprise common acknowledgement resource Information associated with a cell.

The acknowledgement resource Information may comprise temporary acknowledgement resource Information.

The at least one memory and the computer code may be configured, with the at least one processor, to cause transmission of at least one of: system Information, at least one random access message, at least one radio resource control reconfiguration message; and a handover command from said base station, said at least one of said system information, the at least one random access message, the at least one radio resource control reconfiguration message, and the handover command being used to provide at least one of Information on said subset of acknowledgement resource Information and said initial acknowledgement resource Information.

The acknowledgement resource Information may provide Information about a physical uplink control channel to be used by said user device for acknowledgment Information.

The acknowledgment Information may comprise a hybrid automatic repeat request acknowledgement.

The acknowledgement resource information may comprise an acknowledgement resource Indicator.

The subset of acknowledgement resources may comprise at least one resource Index in an orthogonal resource space.

A computer program comprising program code means adapted to perform the herein described methods may also be provided. In accordance with further embodiments apparatus and/or computer program product that can be embodied on a computer readable medium for providing at least one of the above methods is provided.

Various other aspects and further embodiments are also described in the following detailed description of examples embodying the Invention and in the attached claims.

BRIEF DESCRIPTION OF THE DRAWINGS

Some embodiments will now be described in further detail, by way of example only, with reference to the following examples and accompanying drawings, in which.

DETAILED DESCRIPTION

Figure 1:
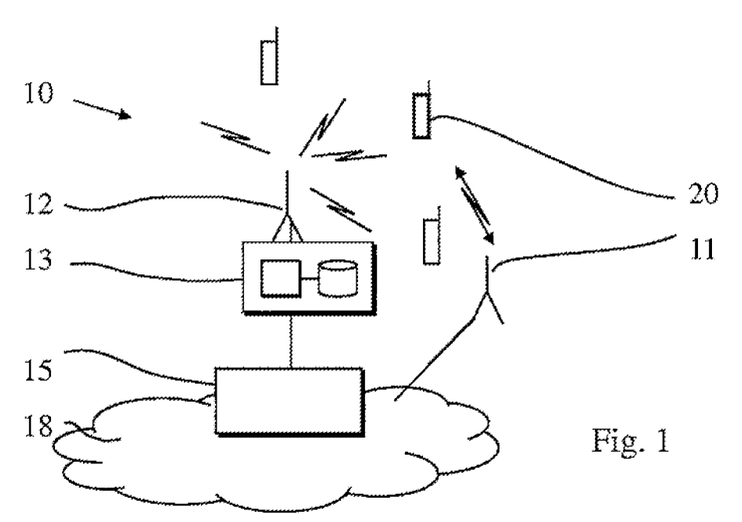
FIG. 1 shows a schematic example of a system where the Invention may be implemented.

In the following certain exemplifying embodiments are explained with reference to a wireless communication system serving devices adapted for wireless communication. Therefore, before explaining in detail the exemplifying embodiments, certain general principles of a wireless system, components thereof, and devices for wireless communication are briefly explained with reference to system 10 of FIG. 1, device 20 of FIG. 2, and control apparatus thereof, to assist in understanding the described examples.

A communication device can be used for accessing various services and/or applications provided via a communication system. In wireless communication systems the access is provided via a wireless access Interface between wireless communication devices and an appropriate access system. A device may access wirelessly a communication system via a base station. A base station site can provide one or more cells of a cellular system. In the FIG. 1 example, a base station 12 can provide e.g. three cells on different carriers. In addition to the base station 12, at least one serving cell can also be provided by means of another station or stations. For example, at least one of the carriers may be provided by a station that is not co-located at base station 12. This possibility is denoted by station 11 in FIG. 1. Interaction between the different stations and/or controllers thereof can be arranged in various manners. Each mobile device 20 and base station may have one or more radio channels open at the same time and may receive signals from more than one source.

A base station node can be connected to a data network 18 via an appropriate gateway 15. A gateway function between the access system and another network such as a packet data network may be provided by means of any appropriate gateway node, for example a packet data gateway and/or an access gateway. A communication system may thus be provided by one or more Interconnect networks and the elements thereof, and one or more gateway nodes may be provided for interconnecting various networks.

A communication device can access a communication system based on various access techniques, for example those based on the third Generation Partnership Project (3GPP) specifications. A non-limiting example of mobile architectures is known as the Evolved Universal Terrestrial Radio Access Network (E-UTRAN). A non-limiting example of base station of a cellular system is what is termed as a NodeB or enhanced NodeB (eNB) in the vocabulary of the 3GPP specifications. The eNBs may provide E-UTRAN features such as user plane Radio Link Control/Medium Access Control/Physical Layer Protocol (RLC/MAC/PHY) and control plane Radio Resource Control (RRC) protocol terminations towards mobile communication devices.

Figure 2:
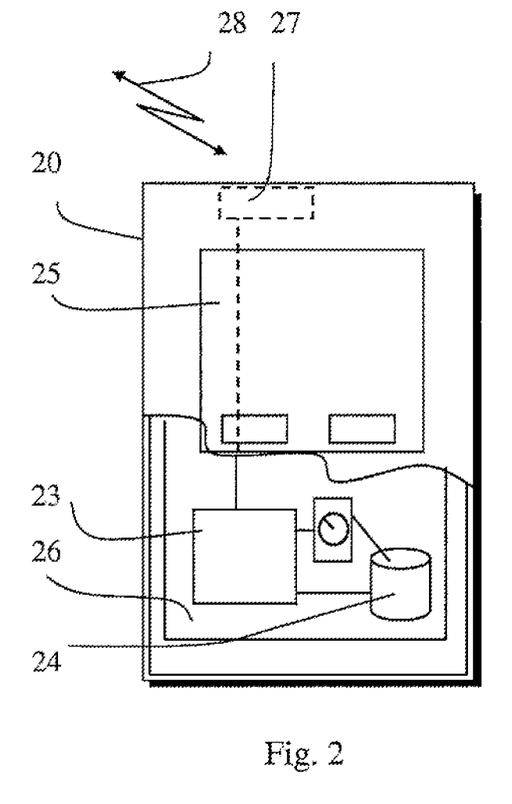
FIG. 2 shows an example of a communication device.

FIG. 2 shows a schematic, partially sectioned view of a communication device 20 that a user can use for communications. Such a communication device is often referred to as user equipment (UE) or terminal. An appropriate communication device may be provided by any device capable of sending and receiving radio signals. Non-limiting examples include a mobile station (MS) such as a mobile phone or what Is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia, positioning data, other data, and so on. Users may thus be offered and provided numerous services via their communication devices. Non-limiting examples of these services Include two-way or multi-way calls, data communication or multimedia services or simply an access to a data communications network system, such as the Internet.

A mobile device is typically provided with at least one data processing entity 23, at least one memory 24 and other possible components 29 for use in software and hardware aided execution of tasks it is designed to perform, including control of access to and communications via base stations and/or other user terminals. The data processing, storage and other relevant control apparatus can be provided on an appropriate circuit board and/or in chipsets. This apparatus is denoted by reference 26.

Various functions and operations of a communications device are arranged into layers in accordance with a hierarchical model. In the model lower layers report to higher layers and receive Instructions therefrom.

A user may control the operation of the device 20 by means of a suitable user Interface such as key pad, voice commands, touch sensitive screen or pad, combinations thereof or the like. A display 25, a speaker and a microphone are also typically provided. Furthermore, a mobile communication device may comprise appropriate connectors (either wired or wireless) to other devices and/or for connecting external accessories, for example hands-free equipment, thereto.

The device 20 may receive and transmit signals 28 via appropriate apparatus for receiving and transmitting signals. In FIG. 2 transceiver apparatus is designated schematically by block 27. The transceiver apparatus may be provided with cognitive radio capability. The transceiver may be provided for example by means of a radio part and associated antenna arrangement. The antenna arrangement may be arranged internally or externally to the mobile device. A wireless communication device can be provided with a Multiple Input/Multiple Output (MIMO) antenna system.

3GPP has defined the concepts of user equipment (UE) specific primary cells (PCell) and secondary cells (SCells). In applications such as carrier aggregation at least but typically only one of the serving cells is denoted primary cell (PCell) whereas the other serving cells are secondary cells (SCells). In the context of LAA, one or more LAA DL secondary cells (SCells) may be configured to a user equipment (UE) as a part of DL carrier aggregation (CA) configuration, while the primary cell (PCell) needs to be on the licensed spectrum. It is expected that Rel-13 LTE LAA will also evolve to support also LAA uplink (UL) transmissions on unlicensed spectrum in later releases, for example in LTE Rel-14.

The LTE LAA approach in Rel-13 based on CA framework assumes transmission of uplink control information (UCI) on the PCell (licensed band). However, LAA may be extended with uplink support including PUCCH (physical uplink control channel.

In the context of LAA UL, one or more LAA SCells may be configured to an UE as a part of UL carrier aggregation configuration. LAA SCell(s) In unlicensed band use Frame Structure type 3, which is a frame structure Introduced in Rel-13 especially for LAA cells.

There might also be Interest to extend LAA with dual connectivity (DC) operation, i.e. allow for non-ideal backhaul between PCell in licensed spectrum and SCell(s) in unlicensed spectrum.

Standalone LTE operation on unlicensed spectrum might be desired in certain applications. LTE standalone operation on unlicensed spectrum would mean that eNB/UE air interface rely solely on unlicensed spectrum without any carrier on licensed spectrum.

Both dual connectivity and standalone operation modes will require transmission of UCI/PUCCH on unlicensed spectrum.

Listen-Before-Talk (LBT) type protocol can be used for opportunistic allocation of resources. Listen-Before-Talk is a contention-based protocol used in wireless communication by allowing several devices to share the same spectrum or channel. If a device wants to transmit information, the device will have to first check that the channel is not already in use.

In LTE operation on unlicensed carriers, depending on the regulatory rules, the UE may need to perform LBT prior to any UL transmission. Some exceptions may exist though.

At least in some regions, transmission of ACK/NACK (acknowledgement/negative acknowledgement) feedback may be possible without LBT when Immediately following a DL transmission (similar to W-Fi operation).

Short control signalling (SCS) rules defined for Europe by ETSI (European Telecommunications Standards Institute) allow for transmission of control signalling with a duty cycle of no more than 5% over 50 ms period without performing LBT. Short control signalling transmissions are transmissions used by adaptive equipment to send management and control frames (e.g. ACK/NACK signals) without sensing the channel for the presence of other signals. It may not be required for adaptive equipment to implement short control signaling transmissions. If Implemented, short control signalling transmissions of adaptive equipment may have a maximum duty cycle of 5% within an observation period of 50 ms. At least in some regions, scheduled UL transmissions may in general be allowed without LBT, when the transmission follows directly a DL transmission before which the eNodeB has performed LBT and total transmission time covering both DL and UL is limited by the maximum Tx burst time defined by the associated regulator.

LTE standalone operation may be developed in a proprietary manner. MulteFire (MLF) developed by Nokia is such an example. In MulteFire, it has been proposed that two types of PUCCH formats are supported—short PUCCH and long PUCCH.

Short PUCCH is a PUCCH structure occupying a few symbols (such as 4 symbols). Short PUCCH is time-domain multiplexed with the PUSCH (physical uplink shared channel). Short PUCCH may support two or more short PUCCH formats. For example, there may be a short PUCCH format designed for transmission of multiple HARQ (Hybrid Automatic Repeat Request)-ACK bits, and another short PUCCH format designed for transmission of PRACH (physical random access channel), SR (scheduling request), and SRS (sounding reference signal).

Long PUCCH refers to a PUCCH structure occupying a PUSCH B-IFDMA (interleaved frequency division multiple access) Interlace and predefined transmission timing (such as 1 ms, i.e., 14 SCFDMA (single-carrier frequency division multiplexing) symbols). Long PUCCH is frequency division multiplexed with the PUSCH.

It is desirable in LTE that UE and base station (eNB) have same "understanding" of the PUCCH resource that is allocated to UE for transmission of HARQ-ACK for PDSCH (physical downlink shared control channel. When performing random access, UE needs PUCCH resource allocation for the first time when it sends HARQ-ACK for random access Msg4. (A contention resolution message Msg4 is transmitted by the eNodeB in downlink PDSCH (physical downlink shared channel) based on the PDCCH (physical downlink control channel) containing a C-RNTI (cell-radio network temporary Identifier) which is used for further communication. In this signalling phase, eNB has not yet had a possibility for configuring dedicated HARQ-ACK resources for the UE via RRC (radio resource control) signalling.

In LTE, PUCCH resource allocation for HARQ-ACK corresponding to DL (PDSCH) transport blocks is primarily Implicit (this covers also HARQ-ACK signalling during and after the initial access). To be specific, the PUCCH resource to be used is determined based on the Index of the lowest PDCCH Control Channel Element (CCE) scheduling the PDSCH. On a 20 MHz system there are at maximum around 80 CCEs/sub-frame, meaning that up to 80 PUCCH resources would need to be reserved for each DL sub-frame. Furthermore, in the case of TDD (time division duplex), HARQ-ACKs for multiple DL sub-frames may need to be carried in one UL sub-frame, meaning that the number of distinct PUCCH resources can become very large.

Due to regulatory restrictions, UL transmission in proprietary systems such as MulteFire is based on Interlaces consisting of multiple (e.g., 6 or 10) equally spaced 1-PRB (physical resource block) clusters. This effectively means that that the number of PUCCH resources available in a sub-frame will be less than that of LTE (due to the fact that PUCCH transmission is wideband, which reduces the multiplexing capacity). At the same time, due to the inherent TDD-nature of MulteFire, there will be a need to provide HARQ-ACK feedback for many DL sub-frames in a single UL sub-frame. Both these aspects make the application of LTE-style Implicit PUCCH resource allocation with one-to-one mapping between a PDCCH CCE and PUCCH resources less desirable. Some embodiments provide alternative methods.

Given that MulteFire is targeting at least mainly small cells, the number of simultaneously scheduled users may be low. Therefore, in some embodiments more resource efficient schemes may be used. In some embodiments, at least partially explicit resource allocation schemes may be used.

As discussed above, PUCCH resource allocation for HARQ-ACK In LTE Is primarily based on one-to-one mapping between an index of the lowest scheduling PDCCH CCE and an index of the PUCCH resource. This is applied in the case of single component carrier operation, and also with carrier aggregation when the scheduling PDCCH Is transmitted in the common search space of the primary cell. The same applies to the initial access scenario when RRC connection has not yet been established. However, in certain carrier aggregation cases, when PUCCH format 3, 4, or 5 is used, explicit PUCCH resource allocation is used. The basic approach is as follows. Upon configuring PUCCH format 3/4/5 for the UE, the eNodeB also configures (via dedicated RRC signalling) four corresponding PUCCH resources. In the scheduling PDCCH DCI (downlink control Indicator) formats there is a 2-bit ACK/NACK Resource Indicator (ARI). Each of the four code points of the ARI corresponds to one of the four PUCCH resources. i.e., when the eNB sends a PDCCH scheduling a PDSCH transmission for a UE, the same PDCCH also tells the UE (through ARI) which one of the four PUCCH resources it should use.

The ARI-based PUCCH resource allocation is in principle a valid approach also in the case of MulteFire. However, the inventors have recognized that there is a problem in how to operate e.g., during Initial access or upon handover procedure to another cell, when RRC-configured resources are not yet available. In any case, the UE will need to know which PUCCH resources to use for HARQ-ACK feedback.

Some embodiments relates to the definition of PUCCH resources corresponding to the ARI In the cases (e.g., primarily initial access) when dedicated RRC signalling (and the corresponding dedicated ARI, d-ARI) is not yet available.

In one embodiment, an aspect is the definition of a common-ARI (c-ARI), and the corresponding PUCCH resources. The c-ARI is a cell-common set of e.g. four PUCCH resources to be used for HARQ-ACK transmission. The PUCCH resources for c-ARI can be for example determined based on the system information signalling such as eSIB (enhanced system information block), and the common PUCCH configuration.

Figure 3:
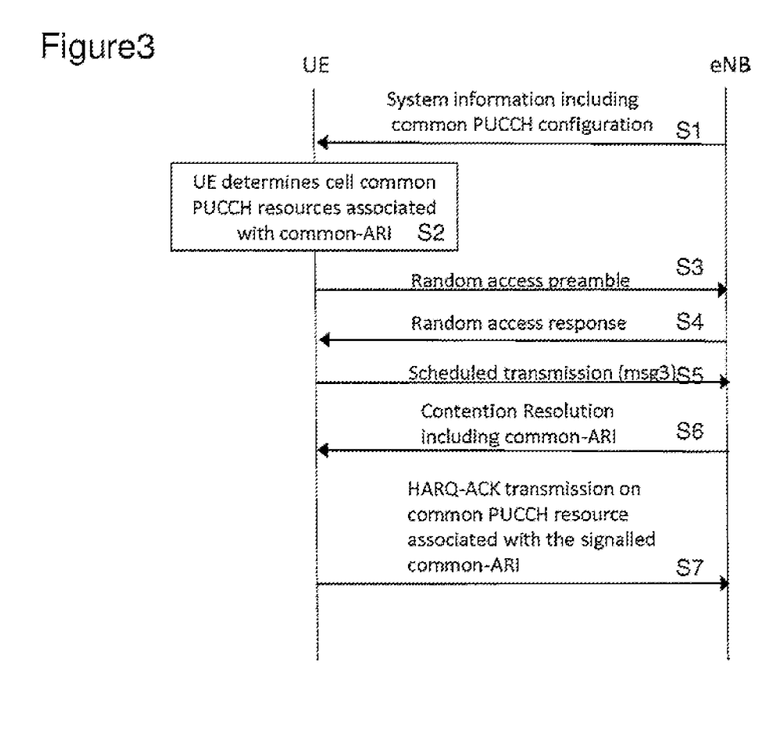
FIG. 3 shows a signal flow using a common ARI.

Reference is made to FIG. 3 which shows the signalling flow in an embodiment.

In step S1, the UE received from the eNodeB, via an eSIB, system information which comprises the common PUCCH configuration. This PUCCH configuration may comprise one or more of the following:

PUCCH channelization structure defining one or more sets of parallel HARQ-ACK resources available for HARQ-ACK;

Index of the first PUCCH Interlace and/or resource to be used for HARQ-ACK;

The number of PUCCH interfaces allocated for HARQ-ACK;

The PUCCH format(s) supported; and

The HARQ-ACK bundling scheme to be applied (if any).

Each set of HARQ-ACK resources may correspond to a predetermined PUCCH format. For example, one set of resources may be defined for a large HARQ-ACK payload and another set for a small/compact HARQ-ACK payload, respectively).

Each HARQ-ACK resource may be associated with a predetermined resource index.

In step S2, the UE determines cell common PUCCH resources used in association with common-ARI (C-ARI). This may be determined, based on the common PUCCH configuration.

In one embodiment with a 2-bit c-ARI, four cell-common PUCCH resources may associated with the c-ARI.

In one embodiment the PUCCH resources associated with c-ARI may be explicitly indicated in the eSIB.

Alternatively, the PUCCH resources associated with c-ARI may be derived based on predetermined rules (which may or may not include information included in the eSIB). For example the PUCCH resources associated with ARI can be e.g. the ones with the lowest PUCCH resource indices.

In another embodiment, the resource indication may include for example an index for B-IFDMA (Block Interleaved Frequency Division Multiple Access) Interlace, cyclic shift and usage of orthogonal cover code (if applied).

In some embodiments, the PUCCH resources are indicated by at least one resource index in an orthogonal resource space. This may for example be one or more of frequency, time, code and space.

In step S3, the UE selects one of the available RACH preambles which is transmitted from the UE to the eNodeB.

In step S4, the eNodeB will, when it receives the UE transmission, transmit a RAR (random access response).

The RAR may include an uplink grant resource and a timing advance value (if timing advance is applied). The RAR step includes providing a PDCCH with a DCI (downlink control information) which includes information about the resource allocation in the PDSCH for the RAR and the PDSCH which carries the RAR.

In step S5, the UE will transmit an Msg3 using the uplink allocations given in RAR. Msg3 is a radio resource connection RRC message such a RRC connection request.

In step S6, the eNodeB transmits a contention resolution message Msg4 Including a common-ARI value.

In step S7, the UE transmits a HARQ-ACK transmission on the common PUCCH resource associated with the common-ARI value received in step S6.

In alternative initial access procedures, two or more signals may be transmitted as combined signals. For example, UE may transmit a random access preamble and a radio resource connection message in a combined signal in one step. Alternatively or additionally, the eNB may transmit random access response and contention resolution message in another combined signal in one step.

Later on, the eNodeB may configure to the UE via dedicated RRC signalling, e.g., as part of UE specific radio resource configuration, UE specific physical channel configuration, and/or UE specific PUCCH configuration a dedicated PUCCH resource subset associated with ARI (for example as in Rel-13). This may include four PUCCH resources of the same or different format.

The common ARI Is common in the cell, i.e. all UE have the same configuration of PUCCH resource subset associated with ARI. This is useful from the signalling point of view since broadcast signalling (system information) can be used. Since all the UEs in the cell share the same (e.g. four assuming 2-bit ARI) PUCCH resources that the ARI can point to, there may be collisions.

Figure 5:
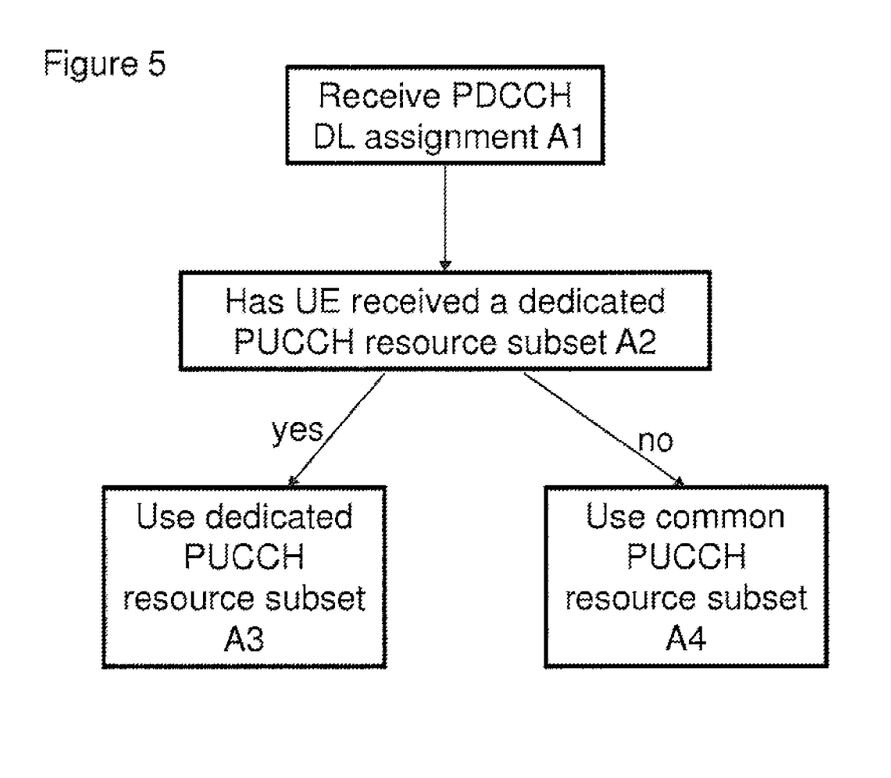
FIG. 5 shows a method for selecting whether to use a dedicated or common ARI.

Reference is made to FIG. 5 which shows a method used by a UE to determine if a common or dedicated PUCCH resource subset is to be used in the determination of PUCCH resource indicated by ARI.

In step A1, the UE receives a PDCCH DL assignment (including ARI) which schedules PDSCH data.

In step A2, the UE will need to determine whether HARQ-ACK resource allocation based on common PUCCH resource subset is to be used. The criterion for using common PUCCH resource subset for HARQ-ACK resource allocation can be for example if UE has not yet received a dedicated PUCCH resource subset configuration. Thus, in step A2, the UE determines if it has received a dedicated PUCCH resource subset configuration.

If not, then in step A4, the UE will use the common PUCCH resource subset for HARQ-ACK resource allocation based on ARI. If so, then in step A3, the UE, will use the dedicated PUCCH resource subset associated with ARI.

The eNB may have full freedom to include any PUCCH resource into common and/or dedicated PUCCH resource subset associated with ARI. This would allow for example choosing to use at least one same PUCCH resource with both common and dedicated ARI, and help in avoiding ambiguity in resource allocation during the time when the RRC configuration of the dedicated ARI is underway.

In another embodiment, assuming for example an n-bit ARI, at least some of the $n^2$ PUCCH resources are always determined based on the common PUCCH resource subset while some other resources are configured as dedicated resources. This allows for robust operation in for example cases where the eNodeB is not yet sure if the RRC configuration for dedicated PUCCH resource subset associated with ARI has already gone through.

In some embodiments, the eNB may not configure dedicated PUCCH resource subset at all. In those scenarios, the eNB may facilitate HARQ-ACK solely based on common PUCCH resource subset, at least for certain UEs. This may be determined based on for example, the number of UEs in the cell and/or UE service type.

Figure 4:
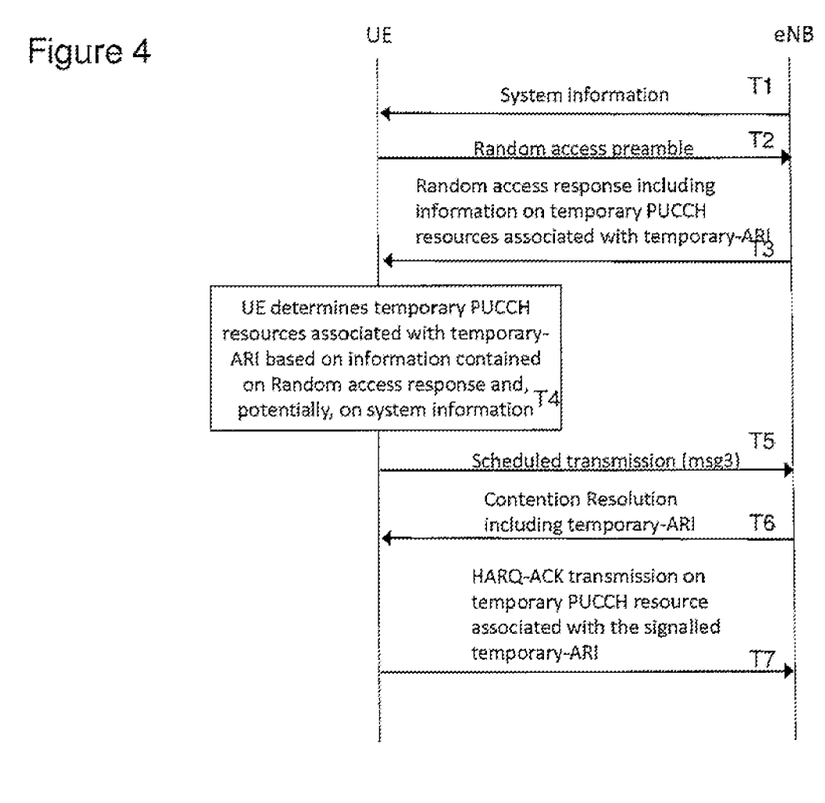
FIG. 4 shows a signal flow using a temporary ARI.

Reference will now be made to FIG. 4 which shows another embodiment and in particular the associated signal flow. In this embodiment, temporary PUCCH resource subset Is used in association with ARI In step T1, the eNB will transmit system Information to the UE.

In step T2, the UE will transmit a random access preamble to the eNB.

In step T3, the eNB will transmit a random access response including Information on temporary PUCCH resources associated with ARI.

In step T4, the UE determines the temporary PUCCH resources associated with the ARI based on the information contained in the random access response and optionally on system information.

In step T5, the UE will transmit an Msg3 using the uplink allocations given in RAR.

In step T6, the eNodeB transmits a contention resolution message Msg4 Including a value for the temporary ARI.

In step T7, the UE transmits a HARQ-ACK transmission on the temporary PUCCH resource associated with the signalled temporary ARI value.

The assignment may done as a part of the random access procedure. In the case of 2-bit ARI, four temporary PUCCH resources may be associated with the ARI. The temporary PUCCH resources associated with ARI may be explicitly Indicated during random access procedure as part of the random access process, for example in Msg2 or Msg4.

The temporary PUCCH resources associated with ARI may thus be signalled to a UE e.g. during the random access procedure using dedicated signalling. This allows for assigning e.g. different sets of four (or other suitable number) PUCCH resources for different UEs, avoiding PUCCH resource collisions. Thus different UEs may be assigned different sets of PUCCHs by the temporary ARI configuration. The temporary ARI does not have the same freedom in signalling the PUCCH resources as the "normal", RRC configured ARI associated PUCCH resource set. Therefore it Is temporary, and may be used only until the PUCCH resource set associated with ARI can be configured with the RRC.

Alternatively, the temporary PUCCH resources associated with ARI may be derived based on predetermined rules using Information included in one or more of the random access messages Msg2, Msg4, and the eSIB.

In some embodiments, UE may derive two or more sets of temporary PUCCH resources according to predetermined rules (which may or may not Include information Included in the eSIB), and use the Information included in the random access Msg2 to select one temporary PUCCH resource set to be used in association with the ARI.

Later on, the eNodeB may configure to the UE via dedicated RRC signalling a dedicated PUCCH resource set associated with the ARI (as in Rel-13). This may include e.g. four PUCCH resources of the same or different PUCCH format. This may be as previously described.

The number of resources associated with the temporary or common ARI may be any suitable number of resources and may differ from the given example number. Generally a subset of some but not all of the resources will be associated with the temporary or common ARI.

It should be appreciated, that in some embodiments, aspects of the method discussed in relation to FIG. 3 may be used in conjunction with aspects of the method discussed in relation to FIG. 4. For example a common ARI may be used instead of a temporary ARI.

It should be appreciated, that in some embodiments, aspects of the method discussed in relation to FIG. 4 may be used in conjunction with aspects of the method discussed in relation to FIG. 3. For example a temporary ARI may be used Instead of a common ARI.

In one more modifications to the examples discussed may be provided in alternative embodiments. For example, one or more different messages may be provided to provide information on the PUCCH resources associated with the common or temporary ARI. One or more different messages may be used to signal the value of the common or temporary ARI.

The examples of FIGS. 3 and 4 have been described in the context of a connection being set up. In alternative or additional embodiments may be used in the context of a handover procedure. For example, a RRC (Radio Resource Control) reconfiguration message could be used to provide information on PUCCH resources associated with the temporary or common ARI.

Some embodiments may use compact HARQ-ACK resource.

Currently the ARI is carried on a PUCCH TPC (transmit power control) field when it is not used for the original purpose. However, in some cases eNB needs to signal PUCCH TPC, in which case the ARI is not available. In one embodiment, a separate field for the ARI may be provided. In an alternative embodiment, the UE may use the non-compact HARQ-ACK form in cases when ARI is available on PDCCH grant, and in predetermined cases UE would select a compact HARQ form, and apply an implicit resource allocation to determine the resource.

Compact HARQ-ACK resources such as short PUCCH can be defined as complementary solution for conveying HARQ-ACK (compared to HARQ-ACK supporting a large payload). Compact HARQ-ACK resources can be defined for the cases of one or two bit HARQ-ACK. For example, when the UE receives one (and only one) PDCCH DL Assignment during a predetermined time window, the UE may apply compact HARQ-ACK resources instead of resources supporting a large payload.

Alternatively, compact HARQ-ACK resources may be applied when the PDCCH Is transmitted in the common search space Alternatively, compact HARQ-ACK resources may be applied when the PDCCH is transmitted on the primary cell.

Alternatively or additionally, compact HARQ-ACK resources may be applied in combination with time domain bundling.

Compact HARQ-ACK resources may apply a separate HARQ-ACK resource set (covering both c-ARI and d-ARI) compared to resources supporting a large HARQ-ACK payload. In certain cases, ARI bits may not be available (e.g.

In the case when PDCCH is transmitted on the PCell common search space). For those cases, a complementary way to determine PUCCH resource index can be defined. It may be a function of various parameters, such as C-RNTI, index of the lowest PRB of PDSCH, CCE or eCCE.

The handling of error cases will now be described. The configuration of dedicated HARQ-ACK resource involves RRC signalling which may involve timing uncertainties. In other words, eNB may not know exactly when dedicated resource configuration has been adopted by UE (because UE processing delay may have not been specified exactly). In those cases, the eNB may monitor multiple PUCCH resources (such as resource corresponding to common PUCCH resource subset and dedicated PUCCH resource subset) at the same time. If the HARQ-ACK Is received via resource belonging to the common PUCCH resource subset, then RRC configuration has not yet been adopted by the UE. If the HARQ-ACK is received via a resource belonging to the dedicated PUCCH resource subset, then eNB can be sure that RRC configuration has been adopted by the UE Some embodiments, facilitate explicit PUCCH resource allocation for HARQ-ACKs, without requiring the UEs to receive a dedicated RRC configuration first. This may be used for example in the case of Initial access. The PUCCH overhead may be significantly reduced compared to Implicit resource allocation. For example, assuming one-to-one mapping between a PDCCH CCE and a PUCCH resource would mean that up to ~80 PUCCH resources need to be reserved corresponding to each DL sub frame Some embodiments may be used in scenarios such as MulteFire scenario having limited multiplexing capacity (in terms of number of simultaneous PUCCH channels) and requiring a relatively large HARQ-ACK payload size.

In some embodiments the temporary/normal/common ARI are distinguished based on the PUCCH resource set associated (at that time) with the ARI.

It is noted that the above discussed Issues are not limited to any particular communication environment, but may occur in any appropriate communication system The required data processing apparatus and functions may be provided by means of one or more data processors. The described functions may be provided by separate processors or by an Integrated processor. The data processors may be of any type suitable to the local technical environment, and may Include one or more of general purpose computers, special purpose computers, microprocessors, digital signal processors (DSPs), application specific Integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can be provided in the relevant devices. The memory or memories may be of any type suitable to the local technical environment and may be Implemented using any suitable data storage technology, such as semiconductor based memory devices, magnetic memory devices and systems, optical memory devices and systems, fixed memory and removable memory. One or more of the steps discussed in relation to FIGS. 3 to 5 may be performed by one or more processors in conjunction with one or more memories.

An appropriately adapted computer program code product or products may be used for Implementing the embodiments, when loaded or otherwise provided on an appropriate data processing apparatus. The program code product for providing the operation may be stored on, provided and embodied by means of an appropriate carrier medium. An appropriate computer program can be embodied on a computer readable record medium. A possibility is to download the program code product via a data network. In general, the various embodiments may be Implemented in hardware or special purpose circuits, software, logic or any combination thereof. Embodiments of the inventions may thus be practiced in various components such as Integrated circuit modules. The design of integrated circuits is by and large a highly automated process. Complex and powerful software tools are available for converting a logic level design into a semiconductor circuit design ready to be etched and formed on a semiconductor substrate.

It is noted that while embodiments have been described in relation to certain architectures, similar principles can be applied to other systems. Therefore, although certain embodiments were described above by way of example with reference to certain exemplifying architectures for wireless networks, technologies and standards, embodiments may be applied to any other suitable forms of communication systems than those Illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

What is claimed is:

1. A method comprising:
   receiving, at a user device, within system information transmitted from a base station, when a radio resource control connection has not yet been established, common physical uplink control channel configuration information associated with a subset of acknowledgement resources in a cell, wherein said common physical uplink control channel configuration information comprises index information indicating at least a supported physical uplink control channel format to be used for transmission of acknowledgements;
   determining, in dependence on said common physical uplink control channel configuration information, which of the acknowledgement resources is to be used in association with a common ACK/NACK resource indicator;
   receiving, prior to receiving dedicated acknowledgement resource information, a message including a common ACK/NACK resource indicator value; and
   causing transmission of, by the user device, based at least upon said index information received with the system information from the base station, an acknowledgement on an acknowledgement resource associated with the common ACK/NACK resource indicator value received prior to receiving dedicated acknowledgement resource information.

2. The method of claim 1, further comprising:
   subsequently receiving said dedicated acknowledgment resource information; and
   causing transmission, by the user device, of an acknowledgment on a dedicated acknowledgement resource associated with said dedicated acknowledgement resource information.

3. The method of claim 1, wherein the common physical uplink control channel configuration information further comprises one or more of the following:
   physical uplink control channel channelization structure defining one or more sets of parallel HARQ-ACK resources;
   index of a first resource to be used for HARQ-ACK;
   first physical uplink control channel interlace to be used for HARQ-ACK;
   number of physical uplink control channel interlaces to be used for HARQ-ACK; or
   a HARQ-ACK bundling scheme to be applied.

4. The method of claim 1, wherein the acknowledgment comprises a hybrid automatic repeat request acknowledgement on a physical uplink control channel.

5. The method of claim 1, wherein the message including the common ACK/NACK resource indicator value is a physical downlink control channel assignment for downlink transmission.

6. The method of claim 5, wherein the acknowledgement is transmitted in response to a contention resolution message of a random access procedure.

7. A method comprising:
configuring, at a base station, common physical uplink control channel configuration information associated with a subset of acknowledgement resources in a cell to be used by a user device prior to said user device receiving dedicated acknowledgement resource information, wherein the common physical uplink control channel configuration information comprises index information indicating at least a supported physical uplink control channel format to be used when receiving acknowledgments;
causing transmission, via system information transmitted from the base station towards the user device, when a radio resource control connection has not yet been established, of said common physical uplink control channel configuration information;
causing transmission of, from said base station, to said user device, a message including a common ACK/NACK resource indicator value; and
receiving, at said base station, from said user device, an acknowledgement on an acknowledgement resource from among said subset of acknowledgement resources in the cell to be used by the user device prior to said user device receiving dedicated acknowledgement resource information, said acknowledgement resource being associated with the common ACK/NACK resource indicator value.

8. The method of claim 7, further comprising:
subsequently causing transmission, from the base station, towards said user device, of said dedicated acknowledgment resource information; and
receiving, at the base station, from the user device, an acknowledgment on a dedicated acknowledgement resource associated with said dedicated acknowledgement resource information.

9. The method of claim 7, wherein the common physical uplink control channel configuration information further comprises one or more of the following:
physical uplink control channel channelization structure defining one or more sets of parallel HARQ-ACK resources;
index of a first resource to be used for HARQ-ACK;
first physical uplink control channel interlace to be used for HARQ-ACK;
number of physical uplink control channel interlaces to be used for HARQ-ACK; or
a HARQ-ACK bundling scheme to be applied.

10. The method of claim 7, wherein the acknowledgement comprises a hybrid automatic repeat request acknowledgement on a physical uplink control channel.

11. The method of claim 7, wherein the message including the common ACK/NACK resource indicator value is a physical downlink control channel assignment for downlink transmission.

12. The method of claim 11, wherein the acknowledgement on said acknowledgement resource is received in response to a contention resolution message of a random access procedure to the user device.

13. A user device comprising:
at least one processor; and
at least one memory storing instructions that, when executed by the at least one processor, cause the user device to perform at least:
receiving, within system information transmitted from a base station, when a radio resource control connection has not yet been established, common physical uplink control channel configuration information associated with a subset of acknowledgement resources in a cell to be used by said user device prior to said user device receiving dedicated acknowledgement resource information, wherein said common physical uplink control channel configuration information comprises index information indicating at least a supported physical uplink control channel format to be used for transmission of acknowledgements;
determining, in dependence on said common physical uplink control channel configuration information, which of the acknowledgement resources is to be used in association with a common ACK/NACK resource indicator;
receiving, prior to receiving dedicated acknowledgement resource information, a message including a common ACK/NACK resource indicator value; and
causing transmission, based at least upon said index information received with the system information from the base station, of an acknowledgement on an acknowledgement resource associated with the common ACK/NACK resource indicator value received prior to receiving dedicated acknowledgement resource information.

14. The user device of claim 13, wherein the message including the common ACK/NACK resource indicator value is a physical downlink control channel assignment for downlink transmission.

15. The user device of claim 14, wherein the acknowledgement is transmitted in response to a contention resolution message of a random access procedure.

16. A base station comprising:
at least one processor and
at least one memory storing instructions that, when executed by the at least one processor, cause the base station to perform at least:
configuring, at the base station, common physical uplink control channel configuration information, said common physical uplink control channel configuration information being associated with a subset of acknowledgement resources in a cell to be used by a user device prior to said user device receiving dedicated acknowledgement resource information;
causing transmission of said common physical uplink control channel configuration information via system information to said user device;
causing transmission of a message including a common ACK/NACK resource indicator value to said user device; and
receiving, from said user device, an acknowledgement on an acknowledgement resource of said subset, said acknowledgement resource associated with the common ACK/NACK resource indicator value,
wherein the common physical uplink control channel configuration information is transmitted to the user device when a radio resource control connection has not yet been established, and
wherein the common physical uplink control channel configuration information comprises index information indicating at least a supported physical uplink control channel format to be used in said receiving of said acknowledgment.

17. The base station of claim 16, wherein the message including the common ACK/NACK resource indicator value is a physical downlink control channel assignment for downlink transmission.

18. The base station of claim 17, wherein the acknowledgement on said acknowledgement resource is received in response to a contention resolution message of a random access procedure to the user device.

19. A non-transitory computer readable storage medium comprising computer program codes that, when executed by a processor, cause at least the following:
receiving, at a user device, within system information transmitted from a base station, when a radio resource control connection has not yet been established, common physical uplink control channel configuration information associated with a subset of acknowledgement resources in a cell, wherein said common physical uplink control channel configuration information comprises index information indicating at least a supported physical uplink control channel format to be used for transmission of acknowledgements;
determining, in dependence on said common physical uplink control channel configuration information, which of the acknowledgement resources is to be used in association with a common ACK/NACK resource indicator;
receiving, prior to receiving dedicated acknowledgement resource information, a message including a common ACK/NACK resource indicator value; and
causing transmission of, by the user device, based at least upon said index information received with the system information from the base station, an acknowledgement on an acknowledgement resource associated with the common ACK/NACK resource indicator value received prior to receiving dedicated acknowledgement resource information.

20. A non-transitory computer readable storage medium comprising computer program codes that, when executed by a processor, cause at least the following:
configuring, at a base station, common physical uplink control channel configuration information associated with a subset of acknowledgement resources in a cell to be used by a user device prior to said user device receiving dedicated acknowledgement resource information, wherein the common physical uplink control channel configuration information comprises index information indicating at least a supported physical uplink control channel format to be used when receiving acknowledgments;
causing transmission, via system information transmitted from the base station towards the user device, when a radio resource control connection has not yet been established, of said common physical uplink control channel configuration information;
causing transmission of, from said base station, to said user device, a message including a common ACK/NACK resource indicator value; and
receiving, at said base station, from said user device, an acknowledgement on an acknowledgement resource from among said subset of acknowledgement resources in the cell to be used by the user device prior to said user device receiving dedicated acknowledgement resource information, said acknowledgement resource being associated with the common ACK/NACK resource indicator value.

21. A method comprising:
receiving, at a user device, when a radio resource control connection has not yet been established, within system information transmitted from a base station, common physical uplink control channel configuration information comprising information indicating a subset of acknowledgement resources in a cell to be used by said user device prior to said user device receiving dedicated acknowledgment resource information, wherein said common physical uplink control channel configuration information comprises index information indicating at least a supported physical uplink control channel format to be used for transmission of acknowledgements;
determining, in dependence on said common physical uplink control channel configuration information, said subset of acknowledgement resources to be used by said user device prior to said user device receiving said dedicated acknowledgment resource information;
receiving, from said base station, prior to receiving dedicated acknowledgment resource information, a message including a common ACK/NACK resource indicator value;
determining, based at least upon said common physical uplink control channel configuration information, an acknowledgement resource from among the subset of acknowledgement resources to be used by said user device prior to said user device receiving dedicated acknowledgement resource information, the acknowledgement resource being associated with said common ACK/NACK resource indicator value received in said message from said base station; and
causing transmission, by said user device, prior to said user device receiving dedicated acknowledgement resource information, of an acknowledgement on said acknowledgement resource determined to be associated with said common ACK/NACK resource indicator value received in said message from the base station.

22. The method of claim 21, further comprising:
subsequently receiving said dedicated acknowledgment resource information and causing transmission by said user device of an acknowledgment in a resource associated with said dedicated acknowledgement resource information.

23. The method of claim 21, wherein acknowledgement resource information of said common physical uplink control channel configuration information further comprises one or more of the following:
physical uplink control channel channelization structure defining one or more sets of parallel HARQ-ACK resources;
index of a first resource to be used for HARQ-ACK;
first physical uplink control channel interlace to be used for HARQ-ACK;
number of physical uplink control channel interlaces to be used for HARQ-ACK;
a supported physical uplink control channel format; or
a HARQ-ACK bundling scheme to be applied.

24. The method of claim 21, wherein said acknowledgment comprises a hybrid automatic repeat request acknowledgement on a physical uplink control channel.

25. The method of claim 21, wherein said message including said common ACK/NACK resource indicator value is a physical downlink control channel assignment for downlink transmission.

26. The method of claim 25, wherein said acknowledgement is transmitted in response to a contention resolution message of a random access procedure.

27. A method comprising:
configuring, at a base station, common physical uplink control channel configuration information comprising information indicating a subset of acknowledgement resources in a cell to be used by a user device prior to said user device receiving dedicated acknowledgement resource information, wherein the common physical uplink control channel configuration information comprises index information indicating at least a supported physical uplink control channel format to be used when receiving acknowledgements;
causing transmission, via system information transmitted from the base station towards the user equipment, when a radio resource control connection has not yet been established, of said common physical uplink control channel configuration information;
causing transmission of, from said base station, towards said user device, a message including a common ACK/NACK resource indicator value; and
receiving, at said base station, from said user device, an acknowledgement on an acknowledgement resource from among said subset of acknowledgement resources in the cell to be used by the user device prior to the user device receiving dedicated acknowledgement resource information, said acknowledgement resource being associated with said common ACK/NACK resource indicator value.

28. The method of claim 27, further comprising:
subsequently causing transmission of said dedicated acknowledgment resource information and receiving from said user device an acknowledgment in a resource associated with said dedicated acknowledgement resource information.

29. The method of claim 27, wherein said common physical uplink control channel configuration information further comprises one or more of the following:
physical uplink control channel channelization structure defining one or more sets of parallel HARQ-ACK resources;
index of a first resource to be used for HARQ-ACK;
first physical uplink control channel interlace to be used for HARQ-ACK;
number of physical uplink control channel interlaces to be used for HARQ-ACK; or
a HARQ-ACK bundling scheme to be applied.

30. The method of claim 27, wherein said acknowledgement comprises a hybrid automatic repeat request acknowledgement on a physical uplink control channel.

31. The method of claim 27, wherein said message including said common ACK/NACK resource indicator value is a physical downlink control channel assignment for downlink transmission.

32. The method of claim 31, wherein said acknowledgement on said acknowledgement resource is received in response to a contention resolution message of a random access procedure to said user device.

33. A user device comprising:
at least one processor; and
at least one memory storing instructions that, when executed by the at least one processor, cause the user device to perform at least:
receiving, from a base station, when a radio resource control connection has not yet been established and prior to receiving dedicated acknowledgement resource information, system information comprising common physical uplink control channel configuration information comprising index information indicating a subset of acknowledgement resources in a cell to be used by said apparatus prior to said apparatus receiving dedicated acknowledgement resource information;
determining, in dependence on said common physical uplink control channel configuration information, said subset of acknowledgement resources to be used by said user device prior to said user device receiving said dedicated acknowledgement resource information;
receiving, from said base station, a message including a common ACK/NACK resource indicator value;
determining, based at least upon said index information received with the system information from said base station, from among said subset of acknowledgement resources to be used by said user device prior to said user device receiving said dedicated acknowledgement resource information, an acknowledgement resource associated with said common ACK/NACK resource indicator value received in said message from said base station; and
causing transmission of, prior to receiving dedicated acknowledgement resource information, an acknowledgement on said acknowledgement resource determined to be associated with said common ACK/NACK resource indicator value received in said message.

34. The user device of claim 33, wherein said message including said common ACK/NACK resource indicator value is a physical downlink control channel assignment for downlink transmission.

35. The user device of claim 34, wherein said acknowledgement is transmitted in response to a contention resolution message of a random access procedure.

36. A base station comprising:
at least one processor; and
at least one memory storing instructions that, when executed by the at least one processor, cause the base station to perform at least:
configuring, at the base station, common physical uplink control channel configuration information comprising index information indicating a subset of acknowledgement resources in a cell to be used by a user device prior to said user device receiving dedicated acknowledgement resource information;
causing transmission, towards the user device, when a radio resource control connection has not yet been established, of system information comprising said common physical uplink control channel configuration information;
causing transmission, towards said user device, of a message including a common ACK/NACK resource indicator value; and
receiving, from said user device, on an acknowledgement resource of said subset of acknowledgement resources that is associated with said common ACK/NACK resource indicator value transmitted in said message, an acknowledgement.

37. The base station of claim 36, wherein said message including said common ACK/NACK resource indicator value is a physical downlink control channel assignment for downlink transmission.

38. The base station of claim 37, wherein said acknowledgement on said acknowledgement resource is received in response to a contention resolution message of a random access procedure to said user device.

39. A non-transitory computer readable storage medium comprising computer program codes that, when executed by a processor, cause at least the following:
receiving, at a user device, when a radio resource control connection has not yet been established, within system information transmitted from a base station, common physical uplink control channel configuration information comprising information indicating a subset of acknowledgement resources in a cell to be used by said user device prior to said user device receiving dedicated acknowledgment resource information, wherein said common physical uplink control channel configuration information comprises index information indicating at least a supported physical uplink control channel format to be used for transmission of acknowledgements;
determining, in dependence on said common physical uplink control channel configuration information, said subset of acknowledgement resources to be used by said user device prior to said user device receiving said dedicated acknowledgment resource information;
receiving, from said base station, prior to receiving dedicated acknowledgment resource information, a message including a common ACK/NACK resource indicator value;
determining, based at least upon said common physical uplink control channel configuration information, an acknowledgement resource from among the subset of acknowledgement resources to be used by said user device prior to said user device receiving dedicated acknowledgement resource information, the acknowledgement resource being associated with said common ACK/NACK resource indicator value received in said message from said base station; and
causing transmission, by said user device, prior to said user device receiving dedicated acknowledgement resource information, of an acknowledgement on said acknowledgement resource determined to be associated with said common ACK/NACK resource indicator value received in said message from the base station.

40. A non-transitory computer readable storage medium comprising computer program codes that, when executed by a processor, cause at least the following:
configuring, at a base station, common physical uplink control channel configuration information comprising information indicating a subset of acknowledgement resources in a cell to be used by a user device prior to said user device receiving dedicated acknowledgement resource information, wherein the common physical uplink control channel configuration information comprises index information indicating at least a supported physical uplink control channel format to be used when receiving acknowledgements;
causing transmission, via system information transmitted from the base station towards the user equipment, when a radio resource control connection has not yet been established, of said common physical uplink control channel configuration information;
causing transmission of, from said base station, towards said user device, a message including a common ACK/NACK resource indicator value; and
receiving, at said base station, from said user device, an acknowledgement on an acknowledgement resource from among said subset of acknowledgement resources in the cell to be used by the user device prior to the user device receiving dedicated acknowledgement resource information, said acknowledgement resource being associated with said common ACK/NACK resource indicator value.

* * * * *